(12) United States Patent
Springer

(10) Patent No.: US 12,425,317 B2
(45) Date of Patent: *Sep. 23, 2025

(54) DIAGNOSTICS-BASED CONFERENCING ENDPOINT DEVICE CONFIGURATION

(71) Applicant: Zoom Communications, Inc., San Jose, CA (US)

(72) Inventor: Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 18/499,882

(22) Filed: Nov. 1, 2023

(65) Prior Publication Data

US 2024/0064081 A1    Feb. 22, 2024

Related U.S. Application Data

(63) Continuation of application No. 18/100,538, filed on Jan. 23, 2023, now Pat. No. 11,848,844, which is a continuation of application No. 17/163,440, filed on Jan. 30, 2021, now Pat. No. 11,563,660.

(51) Int. Cl.

| | | |
|---|---|---|
| *H04L 43/0823* | (2022.01) | |
| *G06F 18/214* | (2023.01) | |
| *H04L 43/50* | (2022.01) | |
| *H04L 65/80* | (2022.01) | |

(Continued)

(52) U.S. Cl.
CPC ........ *H04L 43/0823* (2013.01); *G06F 18/214* (2023.01); *H04L 43/50* (2013.01); *H04L 65/80* (2013.01); *H04N 7/147* (2013.01); *H04N 7/152* (2013.01)

(58) Field of Classification Search
CPC ..... H04L 43/0823; H04L 43/50; H04L 65/80; G06F 18/214; G06F 11/1443; H04N 7/147; H04N 7/152; H04N 7/15; H04N 9/3141

See application file for complete search history.

(56) References Cited

U.S. PATENT DOCUMENTS

| 5,740,161 A * | 4/1998 | Porter | ................. H04L 12/1813 370/260 |
|---|---|---|---|
| 11,563,660 B2 | 1/2023 | Springer | |
| 11,848,844 B2 | 12/2023 | Springer | |

(Continued)

FOREIGN PATENT DOCUMENTS

| CN | 104349040 A | 2/2015 |
|---|---|---|
| WO | 2019099397 A1 | 5/2019 |

OTHER PUBLICATIONS

International Search Report and Written Opinion mailed on Mar. 15, 2022 in corresponding PCT Application No. PCT/US2021/064238.

*Primary Examiner* — Vinncelas Louis
(74) *Attorney, Agent, or Firm* — Young Basile Hanlon & MacFarlane, P.C.

(57) ABSTRACT

Diagnostic output is received from an endpoint device connected to a conference. At least one of a location or an orientation of the endpoint device is determined based on the diagnostic output. A configuration setting for the endpoint device is determined based on at least one of the location, or the orientation of the endpoint device. The configuration setting may be obtained from an artificial intelligence engine that is trained based on various configurations of endpoint devices.

20 Claims, 7 Drawing Sheets

(51) Int. Cl.
  *H04N 7/14*      (2006.01)
  *H04N 7/15*      (2006.01)

(56) References Cited

U.S. PATENT DOCUMENTS

| | | | |
|---|---|---|---|
| 2008/0239164 A1* | 10/2008 | Liang | H04N 9/3141 |
| | | | 348/E5.143 |
| 2010/0085417 A1* | 4/2010 | Satyanarayanan | H04N 7/15 |
| | | | 348/14.08 |
| 2011/0149950 A1 | 6/2011 | Petit-Huguenin et al. | |
| 2012/0287228 A1* | 11/2012 | Mishra | G06F 11/1443 |
| | | | 348/14.09 |
| 2013/0258042 A1 | 10/2013 | Shun et al. | |
| 2017/0171048 A1 | 6/2017 | Christmann et al. | |
| 2019/0342521 A1 | 11/2019 | Goesnar et al. | |
| 2021/0176428 A1 | 6/2021 | Peters et al. | |
| 2021/0211831 A1 | 7/2021 | Gan et al. | |
| 2022/0225040 A1 | 7/2022 | LaBosco | |

* cited by examiner

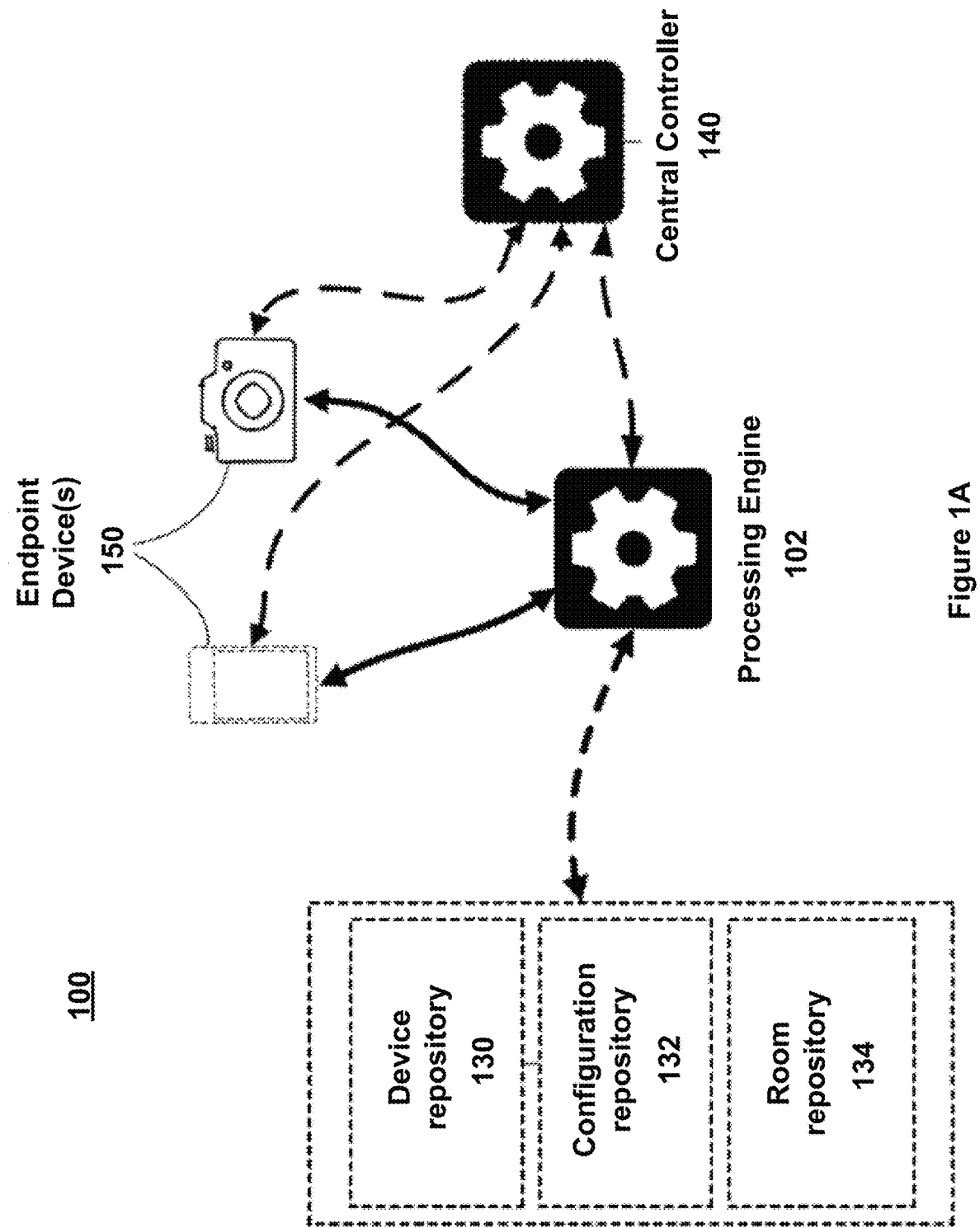

DIAGNOSTICS-BASED CONFERENCING ENDPOINT DEVICE CONFIGURATION

CROSS REFERENCE TO RELATED APPLICATIONS

This application is a continuation of U.S. patent application Ser. No. 18/100,538, filed Jan. 23, 2023, which is a continuation of U.S. patent application Ser. No. 17/163,440, filed Jan. 30, 2021, the disclosures of which are incorporated herein by reference in their entireties.

FIELD OF INVENTION

The present invention relates generally to digital communication, and more particularly, to systems and methods providing for the intelligent configuration of a number of connected conferencing devices.

BACKGROUND

Video conferencing has become one of the most rapidly developing areas of digital communication in recent years. An increasing number of conferences and work meetings are being held remotely, allowing for attendees to join in from anywhere in the world. Such events are often facilitated by high-quality audio and video setups that deliver experiences which are comparable to attending in person.

While such setups often lead to a great audiovisual experience, many problems have arisen. First, it takes a considerable amount of manual setup and thought to coordinate such a high-quality setup. This is especially the case for conferences and meetings which have multiple presenters, panelists, or audience participants to handle, have requirements for multiple views to switch between, have multiple microphones which need to be configured in a specific array, and other video conferencing contexts to consider. Not only is it important to think about the positioning of different devices within a conferencing room, but also aspects such as the orientation the devices are facing in, output quality (including, for example, video resolutions), and more.

In some cases, this configuration of multiple devices may be possible when using endpoint devices from a single developer or manufacturer which are designed to connect together and operate in synchronicity. In most situations, however, companies and individuals own multiple devices from multiple manufacturers, and such devices are not designed to communicate with each other in many situations. In addition, within the fluid, rapidly changing situations of conferences and meetings, it may often be the case that attendees will unexpectedly have to move to a different room with different dimensions, or one microphone or video camera device will fail and a substitute will need to be quickly set up to replace it. In some cases, an additional speaker will unexpectedly join and will need to be accommodated. Such fluid, changing contexts often require time-intensive, complicated reorganization and reconfiguration of the endpoint devices in the room.

Thus, there is a need in the field of digital communication to create a new and useful system and method providing for the intelligent configuration of a number of connected conferencing devices. The source of the problem, as discovered by the inventors, is a lack of device-agnostic methods for connecting multiple disparate devices and determining optimal settings configurations for each of the devices in a way that quickly accommodate specific demands and requirements for differing video conferencing setups.

SUMMARY

The invention overcomes the existing problems by providing for the dynamic, intelligent configuration of endpoint devices within a video conferencing context. This enables devices such as cameras and microphones which may be dissimilar from one another to be used in conjunction to drive optimal audio and video experiences. When multiple people meet together in a single conference room, this approach enables a configuration of disparate audio and video devices to be used to provide optimal views of presenters or speakers, and optimal audio to be able to hear each presenter or speaker as clearly as possible. In varying embodiments, the intelligent configuration of these devices can include optimal locations and orientations of devices, output quality, switching from one device to another for capturing a certain presenter, and much more. In some embodiments, this dynamic configuration is performed in real time or substantially real time to provide as quick a setup as possible under limited time constraints. In some embodiments, devices within the room can be added or removed to fit different needs or contexts, and the dynamic configuration of the devices can be performed in real time or substantially real time to provide new optimal configurations of the devices in the room, taking into account the added or removed devices.

In one example, a conference room has dimensions of IO feet by IO feet. There are two microphones in the room, and the microphones can be intelligently configured within the room to determine where the placement and orientation of the microphones should be within the room based on where two presenters are positioned, how loud the presenters are, and other considerations. In a second example, a conference room has one video camera in it, and operates in a certain way. A second camera is then added. An intelligent configuration of the two cameras can be determined such that optimal placement and orientation of the cameras can be determined for the video conferencing context needed. If eight more cameras are added, then an intelligent configuration can be determined based on, e.g., the current room conditions, including how sound travels, which views of presenters are obscured by objects, and other factors to provide an optimal configuration of the ten cameras.

One embodiment relates to a method for providing intelligent configuration of a device mesh for video conferencing. First, the system identifies a plurality of endpoint devices within a room which are communicatively connected. The system then determines a quantity of the endpoint devices. For each of the endpoint devices, the system performs one or more diagnostic operations to receive diagnostic output from the endpoint device, determines a location and an orientation of the endpoint device within the room using the received diagnostic output, and determines whether the diagnostic output meets or exceeds a threshold for output quality. Finally, the system processes the diagnostic outputs of the endpoint devices to determine an optimal settings configuration for each of the endpoint devices. The optimal settings configuration is dependent on at least the quantity, location, orientation, and output quality of the endpoint devices.

In some embodiments, artificial intelligence (AI) processes and techniques, such as, e.g., machine learning (ML) and computer vision may be used to process the diagnostic outputs of the endpoint devices and to determine optimal settings configurations for the endpoint devices. In some embodiments, one or more AI engines can be trained one datasets which include various configurations of endpoint devices in differing quantities. The diagnostic outputs are then processed by the trained AI engines to determine optimal settings configurations.

In some embodiments, the system determines current room conditions of the room based on the received diagnostic outputs. The optimal settings configurations are further determined based on these current room conditions.

In some embodiments, the system can periodically determine a video conferencing context, then determine that the video conferencing context involves a subject that is currently off-screen. The system then determines the location and orientation of the off-screen subject, and adaptively switches from a first endpoint device to a second endpoint device capable of better capturing the off-screen subject.

In some embodiments, the system can determine the location and orientation of one or more presenters in the room based on at least the diagnostic output. The system then determines an optimal location and orientation for at least one of the endpoint devices based on the settings configuration and the location and orientation of the presenters. The system then provides a notification to a user associated with the endpoint device of the determined optimal location and orientation for the device.

In some embodiments, the system determines a video conferencing context with a plurality of presenters in the room, then determines approximate locations and orientations of the presenters in the room based on the received diagnostic outputs from the endpoint devices. The system determines optimal locations and orientations of at least a subset of the endpoint devices, where the optimal locations and orientations correspond to the locations and orientations of the plurality of speakers in the room. The system then sends notifications to users associated with the endpoint devices with respect to the optimal locations and orientations of the endpoint devices.

In some embodiments, the system is capable of determining a proximity and positioning of each of the endpoint devices relative to the other endpoint devices. The optimal settings configuration is further determined based on the proximity and positioning of each of the endpoint devices relative to the other endpoint devices.

In some embodiments, a central controller is configured to coordinate the endpoint devices with respect to one another. In some embodiments, the central controller can emit an ultrasonic tone in the room. The system can capture this ultrasonic tone via audio inputs of at least a subset of the endpoint devices, and process the captured ultrasonic tone to determine one or more optimization parameters for the room, where the optimal settings configurations is further determined based on the optimization parameters for the room.

In some embodiments, a new endpoint in the room 1s detected. The system communicatively connects the new endpoint device to the other endpoint devices in the room, then performs one or more diagnostic operations on the new endpoint device to receive diagnostic output from the new endpoint device. The system processes the diagnostic outputs of the endpoint devices to determine new optimal settings configurations for each of the endpoint devices, including the new endpoint device.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present invention relates generally to digital communication, and more particularly, to systems and methods providing for the intelligent configuration of endpoint devices within a video conferencing setup.

The present disclosure will become better understood from the detailed description and the drawings, wherein:

FIG. 1A is a diagram illustrating an exemplary environment in which some embodiments may operate.

DETAILED DESCRIPTION

Figure 1B:
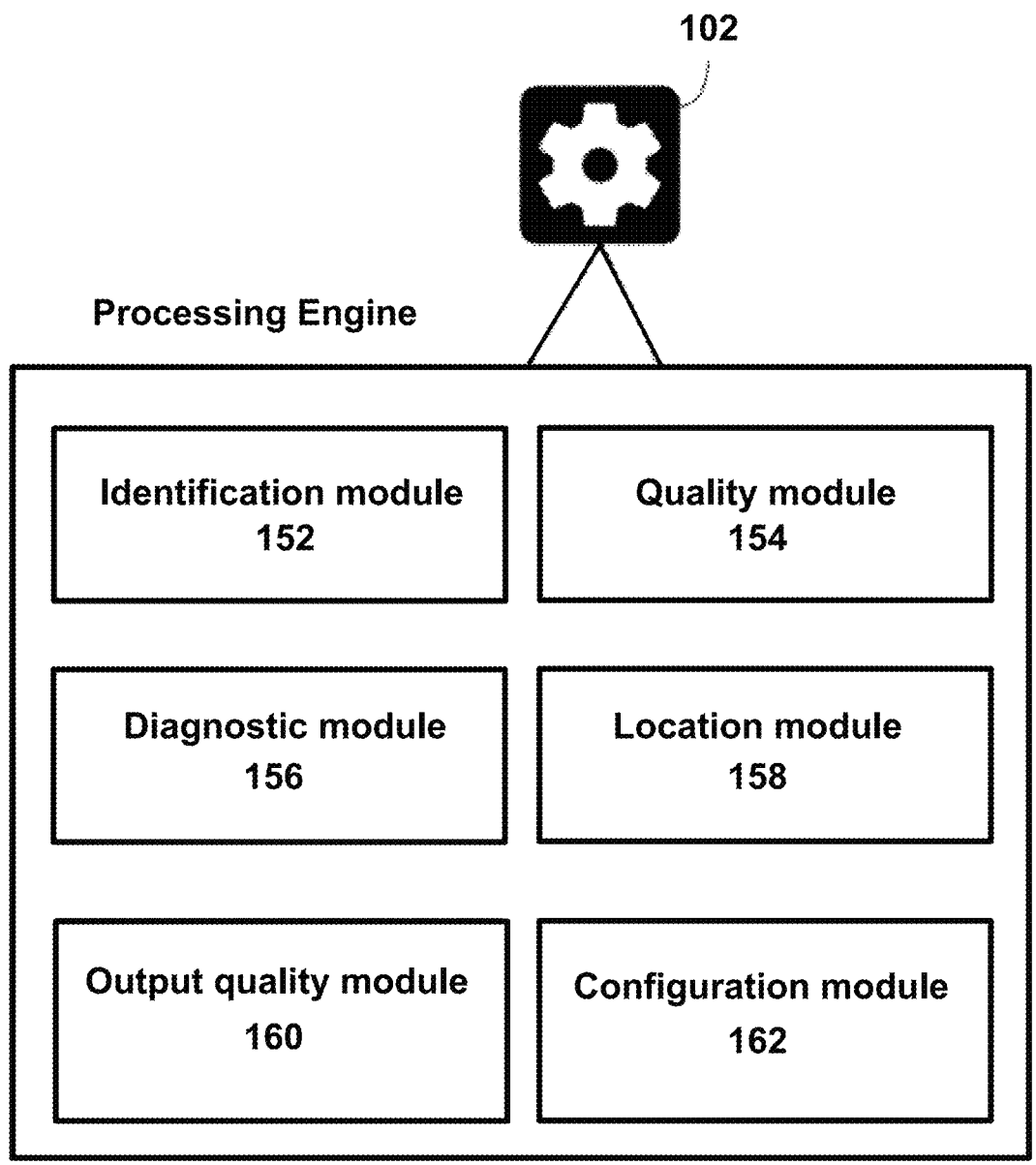
FIG. 1B is a diagram illustrating an exemplary computer system that may execute instructions to perform some of the methods herein.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment m which some steps are performed by different computers m the networked environment.

Some embodiments are implemented by a computer system. A computer system may include a processor, a memory, and a non-transitory computer-readable medium. The memory and non-transitory medium may store instructions for performing methods and steps described herein.

Many other possibilities and options can be contemplated for this use case and others, as will be described in further detail throughout.

I. Exemplary Environments

FIG. 1A is a diagram illustrating an exemplary environment in which some embodiments may operate. In the exemplary environment 100, endpoint device(s) 150 are connected to a processing engine 102 and, optionally, a central controller 140. The processing engine 102 can also be connected to the central controller 140, and optionally connected to one or more repositories and/or databases, including a device repository 130, configuration repository 132, and/or a room repository 134. One or more of the databases may be combined or split into multiple databases. The endpoint device(s) 150 may include a first user's client device and additional users' client device(s) in this environment may be computers, and the central controller 140 and processing engine 102 may be applications or software hosted on a computer or multiple computers which are communicatively coupled via remote server or locally.

The exemplary environment 100 is illustrated with only two endpoint devices, one processing engine, and one central controller, though in practice there may be more or fewer endpoint devices, processing engines, and/or central controllers.

In an embodiment, the processing engine 102 may perform the method 200 (FIG. 2A) or other method herein and, as a result, provide intelligent configuration of endpoint devices within a video conferencing setup. In some embodiments, this may be accomplished via communication with the endpoint devices, processing engine, central controller, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The endpoint device(s) 150 are devices which are capable of capturing and transmitting audio and/or video. In some embodiments, the devices may be, e.g., a video camera, photo camera, microphone, smartphone, tablet or other mobile device, desktop or laptop computer, VR headset, or any other suitable device capable of capturing and transmitting audio and/or video. In some embodiments, the endpoint device is also capable of receiving audio and/or video from remote participants in a video session. In some embodiments, the endpoint devices and communicatively coupled to one another. This may be accomplished by a network, device mesh, beacon and/or signaling technology, or any other suitable way to communicatively connect endpoint devices. In some embodiments, the endpoint device(s) 150 present information in the form of a user interface (UI) with UI elements or components. In some embodiments, the endpoint device(s) 150 send and receive signals and/or information to the processing engine 102 and/or central controller 140. The endpoint device(s) are configured to perform functions related to presenting and, optionally, playing back video, audio, documents, annotations, and other materials within a video presentation (e.g., a virtual conference, meeting, class, lecture, webinar, or any other suitable video presentation) on a video communication platform. The endpoint devices are configured to present video and/or audio, and in some cases, access presented video and/or audio as well. In some embodiments, one or more endpoint device(s) are cameras or devices which include an embedded or connected camera. In some embodiments, this camera is capable of generating and transmitting video content in real time or substantially real time. For example, one or more of the endpoint devices may be smartphones with built-in cameras, and the smartphone operating software or applications may provide the ability to broadcast live streams based on the video generated by the built-in cameras. In some embodiments, one or more of the endpoint device(s) are associated with one or more user accounts on a video communication platform.

In some embodiments, multiple devices may be configured to connect together in a synchronized way. For example, multiple microphones may connect to one another to provide a coordinated microphone array which is used to capture audio.

In some embodiments, the central controller 140, which may be optional, can be a device which is configured to centrally connect and control the endpoint devices in the room. Such a device may contain instructions to intelligently and dynamically connect the disparate devices such that they are able to work in a coordinated fashion together for a given video conferencing context. In some embodiments, the central controller is configured to send instructions to the endpoint devices from the processing engine, to automatically configure one or more devices in relation to other devices, and perform similar tasks and operations with respect to the endpoint devices.

In some embodiments, optional repositories can include one or more of a device repository 130, configuration repository 132, and/or room repository 134. The optional repositories function to store and/or maintain, respectively, information associated with the endpoint device(s) 150, configuration profiles and settings for the endpoint device(s) 150, and room settings for different rooms where video conferencing has or will take place. The optional database(s) may also store and/or maintain any other suitable information for the processing engine 102 or central controller 140 to perform elements of the methods and systems herein. In some embodiments, the optional database(s) can be queried by one or more components of exemplary environment 100 (e.g., by the processing engine 102), and specific stored data in the database(s) can be retrieved.

FIG. 1B is a diagram illustrating an exemplary computer system with software modules that may execute some of the functionality described herein.

Identification module 152 functions to identify a number of endpoint devices within a room which are communicatively connected.

Quantity module 154 functions to determine a quantity of the endpoint devices.

Diagnostic module 156 performs one or more diagnostic operations to receive diagnostic output from each of the endpoint devices.

Location module 158 functions to determine a location and an orientation of each of the endpoint devices within the room using the received diagnostic output.

Output quality module 160 functions to determine whether the diagnostic output meets or exceeds a threshold for output quality.

Configuration module 162 functions to process the diagnostic outputs of the endpoint devices to determine an optimal settings configuration for each of the endpoint devices.

The above modules and their functions will be described in further detail in relation to an exemplary method below.

II. Exemplary Method

Figure 2A:
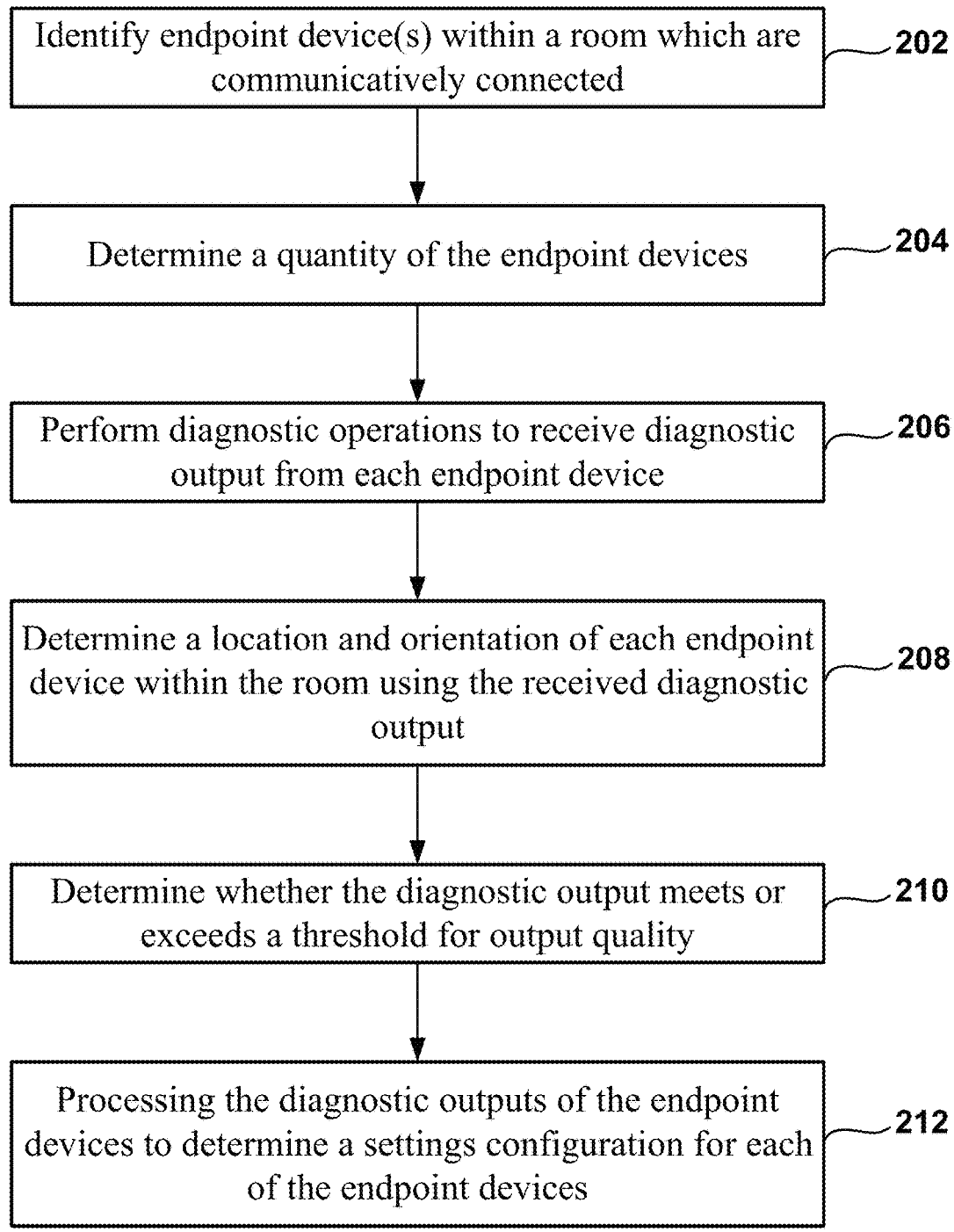
FIG. 2A is a flow chart illustrating an exemplary method 200 that may be performed in some embodiments.

FIG. 2A is a flow chart illustrating an exemplary method that may be performed in some embodiments.

At step 202, the system identifies a number of endpoint devices within a room which are communicatively connected. The endpoint devices are configured to capture video and/or audio and transmit them to at least one processing engine, central controller, or some combination thereof. Such endpoint devices may be, e.g., one or more video cameras or photo cameras, microphones, audio recorders, smartphones with audio and/or video inputs and/or outputs, tablets or other mobile devices, desktop or laptop computers, VR headsets, or any other suitable devices capable of capturing audio and/or video and transmitting them.

In some embodiments, the endpoint devices can be communicatively connected over a network, device mesh, Bluetooth and/or signaling technologies, or any other suitable method of communicatively connecting devices with one another. In some embodiments, the devices are each connected to a central controller, which in turn connects the devices to one another. In some embodiments, the devices are connected locally via a mesh network, i.e., a local network topology in which the devices connect directly, dynamically and non-hierarchically to other devices within the network. In some embodiments, the devices are connected via a local house network or similar network. In some embodiments, the devices are connected via Bluetooth signaling or beacon technologies which are configured to determine a proximity and/or positioning of endpoint devices within the room.

Figure 3:
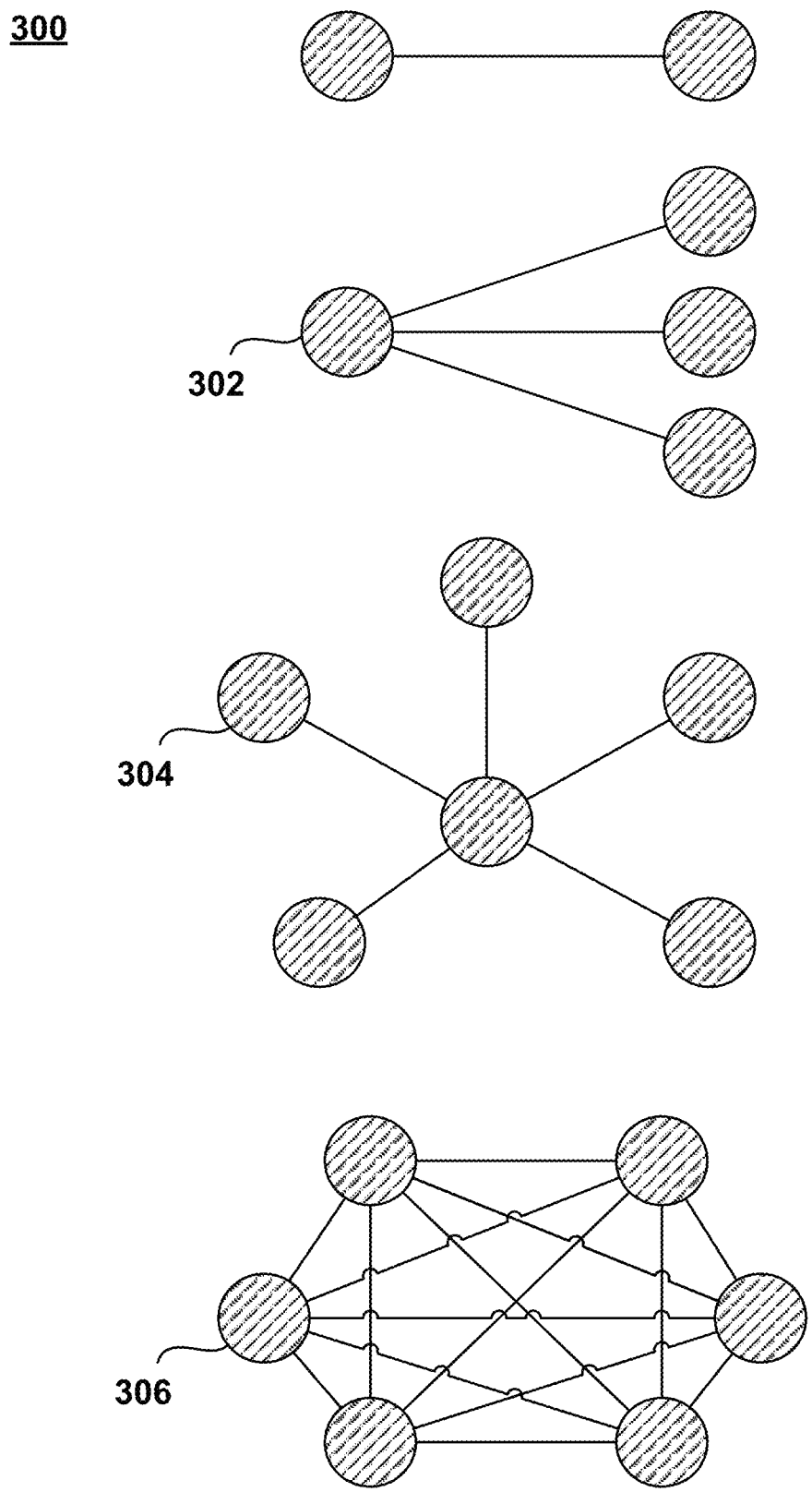
FIG. 3 is a diagram illustrating one example embodiment 300 of potential configurations of endpoint devices within various connected topologies.

FIG. 3 is a diagram illustrating one example embodiment 300 of potential configurations of endpoint devices within various connected topologies. Such topologies represent an example of how endpoint devices may be communicatively connected to one another.

Topology 302 represents point-to-point and point-to-multipoint topologies, wherein a single connection interface functions to connect one endpoint device to another endpoint device. A single endpoint device can be connected to multiple endpoint devices in such a fashion. One example of a connection interface for such topologies is Bluetooth technologies.

Topology 304 represents a star topology, wherein data passes from a sender, such as a processing engine, to a central controller which acts as a central hub node, and then to multiple endpoint devices which act as destination nodes. A wi-fi router is one example of a device which may enable such connections between devices. A live streaming video controller may also provide the ability to connect multiple endpoint devices for a video streaming context.

Topology 306 represents a mesh topology, wherein data can be exchanged with any neighboring endpoint device in the setup. If the receiver is not within range, the data is passed from endpoint device to endpoint device until it reaches the destination device. This mesh topology may be enabled by, e.g., Bluetooth mesh technology or other mesh technology.

Other network topologies which may be used to communicatively connect the devices may include, e.g., partially or fully connected mesh networks, ring topology, bus topology, hybrid topology, or any other suitable network topology.

Returning to FIG. 2A, step 202, in some embodiments, the system can identify the endpoint devices by retrieving information about connected devices from the processing engine, central controller, network devices, or any other device capable of identifying connected endpoint devices within the system. In some embodiments, one or more endpoint devices may be pinged or otherwise sent data upon request of a network device to verify connection within the room.

At step 204, the system determines a quantity of the endpoint devices. In some embodiments, the system determines the quantity of the endpoint devices by enumerating the list of devices which are communicatively connected within the room.

In some embodiments, the system can additionally determine a personnel or user record(s) associated with each endpoint devices. Determining personnel or user records can be useful in some embodiments for handling the endpoint device differently depending on which user or users are associated with the endpoint device. For example, an endpoint device associated with the president of a company may be treated differently from an endpoint device associated with a new associate. In some embodiments, one or more user-associated profiles can be retrieved based on users associated with the device, and the profiles can be used for specific device settings or optimal configurations to be applied in later steps.

At step 206, the system performs one or more diagnostic operations to receive diagnostic output from each of the endpoint devices. Diagnostic operations are operations performed by devices or components within the system for optimization, quality, issue diagnosis, data collection, or other purposes, Examples of such diagnostic operations may include operations, e.g., to determine a position of a capture device within a room, to determine the position of one or more presenters within a room, to diagnose and resolve a recording issue, to understand whether an endpoint device is facing a correct orientation with respect to a subject it is recording, to determine an optimal location of a microphone with respect to other microphones within a microphone array, and any other suitable diagnostic purpose.

Diagnostic output which the system receives from each of the endpoint devices represents output data which has been captured by the endpoint device as a result of the diagnostic operations. Such endpoint data may include, e.g., captured audio recordings which were made in response to diagnostic operations, captured image and/or video recordings, prediction output regarding locations, orientations, quantity, and more of endpoint devices, presenters, participants, and more. For example, one diagnostic output may be a number of detected participants to a particular video session.

In some embodiments and examples, the diagnostic operations include a central controller or other device within the room being instructed by the system to emit an ultrasonic tone or other tone within the room. This ultrasonic tone, in turn, is captured via the audio inputs of at least a subset of the endpoint devices. For example, any endpoint device capable of capturing audio may be instructed to capture the tone. In some embodiments, the endpoint devices then send the captured ultrasonic tone to the processing engine as diagnostic output from those endpoint devices. The captured ultrasonic tone from each endpoint device can provide information to the processing engine about the locations and positions of the endpoint devices which captured the tone. The audio capture quality and other aspects may be determined based on this captured recording as well.

In some embodiments, rather than an ultrasonic tone being emitted from a source, the diagnostic operations include instructing at least a subset of the endpoint devices to record ambient environmental noise in the room, which then gets sent to the processing engine as diagnostic output from those endpoint devices. The captured ambient environmental noise will provide a basis for the processing engine to analyze the capabilities and characteristics of the different audio capturing devices, both in isolation and in comparison to one another.

In some embodiments, one or more presenters or others in the room may be asked to stand in various spots and speak as if presenting to the room. Capturing the resulting audio can be a form of diagnostic output from the endpoint devices.

Similarly to audio, in some embodiments, one or more visual diagnostic tests may be performed by a central controller or other device within the room in order to test various visual capabilities of cameras and other endpoint devices which are configured to capture video or other imagery. In some embodiments, the presenters may be asked to stand in the places within the room they will be presenting, and the resulting captured video can be a form of diagnostic output from the endpoint devices.

In some embodiments, the system periodically determines a video conferencing context, then determines that the video conferencing context involves a subject that is currently off-screen. The system then determines the location and orientation of the off-screen subject, and adaptively switches from a first endpoint device to a second endpoint device capable of better capturing the off-screen subject.

Many other such diagnostic operations may be conducted to receive diagnostic output from endpoint devices, depending on various needs and contexts within the video recording setup.

At step 208, the system determines a location and an orientation of each of the endpoint devices within the room using the received diagnostic output. In some embodiments, the diagnostic output takes the form of an audio or video recording received from the endpoint devices which can be used to identify a location and orientation of the devices based on the output. In some embodiments, one or more audio analysis techniques are used to determine the approximate distance of a recorded object from an audio capture device, as well as an approximate orientation of the device with respect to the recorded object. The audio analysis techniques for determining location and orientation from recordings of objects may include one or more of, e.g., acoustic source localization, monaural and binaural localization, time delay-based methods, beamforming-based methods, spectral estimation-based methods, use of microphone arrays, use of machine learning and neural network techniques, and any other suitable techniques for determining location and position from audio sources.

In some embodiments, one or more image analysis techniques are used to determine the approximate location and position of the audio capture device from the sound of a single object. Such image analysis techniques may include, e.g., camera pose estimation using two-dimensional image datasets, histogram template matching, binary connectivity analysis, ellipse fitting, quadrature filter-based methods, and any other suitable techniques for determining location and position from images.

For example, in the scenario above of a controller emitting an ultrasonic tone, the system identifies or receives the location of the controller emitting the tone (e.g., upon the controller connecting to a network, the controller reports its location data). The system can then estimate or approximate a location and orientation of endpoint devices which captured the audio of that tone by processing the distance of the tone in the recording and any stereo spatialization information which is received from the device with respect to the tone being placed within the stereo field. Many other techniques can be contemplated for the same tasks.

At step 210, the system determines whether the diagnostic output meets or exceeds a threshold for output quality. In some embodiments, the system processes the diagnostic output to perform some determination, detection, and/or prediction of an output quality. Output quality may be made up of characteristics which are analyzed independently by the system, e.g., audio or video resolution, amount of compression, microphone or camera sensitivity, detected audio or video codec used, amount of audio or video artifacts or other similar aspects detected, or any other suitable criteria for output quality of audio or video. The threshold may be pre-defined with a default value for these characteristics, or a user or presenter may manually specify a threshold of output quality.

At step 212, the system processes the diagnostic outputs of the endpoint devices to determine an optimal settings configuration for each of the endpoint devices. In some embodiments, the system processes the diagnostic outputs along a number of criteria which may affect audio and video experience, such as, e.g., quantity of endpoint devices, location of endpoint devices, orientation of endpoint devices, and output quality of endpoint devices. By processing one or more of these criteria or other criteria, and comparing the results of the processing of the different endpoint devices to one another, the system can gain insights into how to improve configuration along the criteria. The system then determines, approximates, or predicts the optimal settings configurations of the endpoint devices.

For example, based on two audio recording devices with connected microphones capturing the sound of an audio tone being emitted in the room, the system can determine through processing that one of the microphones is positioned on a table in the room, while another of the microphones is positioned on the ceiling of the room. The system can compare the audio output characteristics of the two devices and determine that they are acoustically different in nature, and can determine further characteristics based on this analysis.

In some embodiments, one or more artificial intelligence (AI) engines can be used in whole or in part to process the diagnostic outputs and determine optimal settings configurations. Machine learning (ML), computer vision, and/or other processes and techniques can be employed. In some embodiments, the system trains one or more AI engines on a dataset which consists of various configurations of endpoint devices in different quantities, along with any other necessary information (such as, e.g., placement of presenters in the room and how loud each of their voices are). In some embodiments, the dataset is labeled with data such as whether the configuration is considered to be "optimal" or not. The engines become trained by ingesting a large amount of such data and learning what configurations would be optimal in certain conditions. The system then uses the AI engines to determine how to change suboptimal configurations to transform them into optimal configurations.

In some embodiments, upon determining the optimal settings configuration of the device, the system sends one or more notifications to users associated with at least one of the endpoint devices with respect to the optimal settings configurations of the endpoint devices. In some embodiments, the system automatically adjusts one or more output settings for at least one of the endpoint devices based on the optimal settings configurations of the endpoint devices. For example, the system may increase the volume of a video recorder if the input and/or output volume of the video recorded is too low to be heard properly.

In some embodiments, the system is configured to determine a video conferencing context with a number of presenters involved in the room. The system determines approximate locations and orientations of the presenters in the room based on the received diagnostic outputs from the endpoint devices, then determines optimal locations and orientations of at least a subset of the endpoint devices in the room based on the received diagnostic outputs from the endpoint devices, with the optimal locations and orientations corresponding to the approximate locations and orientations of the presenters. Notifications are then sent to users associated with the endpoint devices with respect to the optimal locations and orientations of the endpoint devices.

In some embodiments, the system is configured to determine a proximity and positioning of the endpoint devices to one another. The optimal settings configuration is then partially determined based on this proximity and positioning.

In varying embodiments, any of steps 202 through 212 may be repeated periodically, semi periodically, or continuously, such that endpoint devices can continue to be identified, diagnostic operations are performed, diagnostic outputs are processed, and settings configurations are determined on an ongoing basis during any given session.

In some embodiments, a local endpoint device may be processed via the cloud in various ways, such that cloud control over endpoint devices may be established. Processing of diagnostic outputs and/or determination of optimal settings configurations may be possible over cloud control of the endpoint devices in this way. For example, it may be possible for a user to alter the acoustic profile of the audio output of the device via an equalizer on the device over cloud control.

Figure 2B:
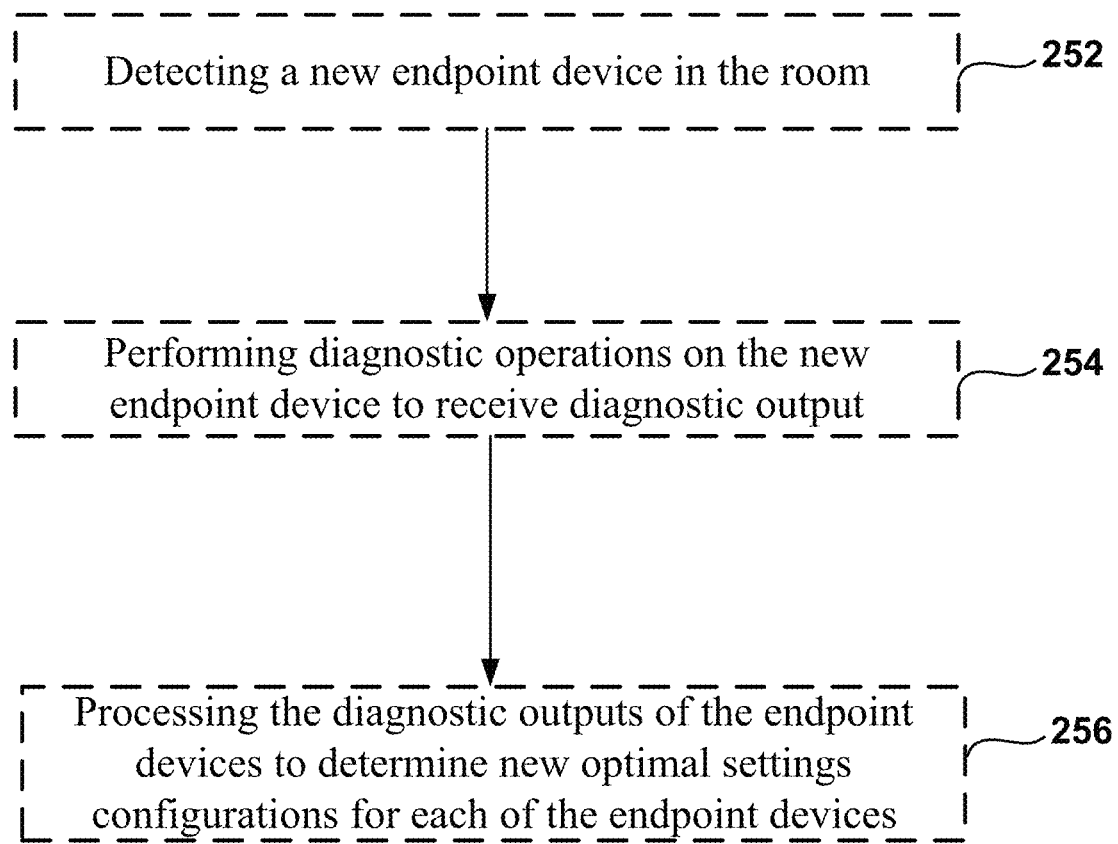
FIG. 2B is a flow chart illustrating an exemplary method 250 that may be performed in some embodiments.

FIG. 2B is a flow chart illustrating another exemplary method 250 that may be performed in some embodiments.

At optional step 252, the system detects a new endpoint device in the room. In some embodiments, the new endpoint device is detected by the system when it is connected (e.g., automatically or manually) to one or more devices, to a network, to a central controller, and/or to the processing engine. For example, a new participant might join the room midway through a presentation, carrying an audio recorder. The person then connects the audio recorder to a central controller in the room via Bluetooth, and upon connecting, the central controller sends data to the processing engine that a new device has connected to the mesh of devices. In some embodiments, the system detects a device that has already been present in the room, but has had one or more components enabled. For example, a participant within the room might enable a camera on a laptop, and then authorize connecting the camera to one or more other devices within the room. Upon connecting, the system detects the connected camera of the laptop.

At optional step 254, the system performs one or more diagnostic operations on the new endpoint device to receive diagnostic output from the new endpoint device. In some embodiments, the system performs the diagnostic operations on the new endpoint device in the same way that it performed diagnostic operations on the previous endpoint devices, as in FIG. 2A, step 206.

At optional step 256, the system processes the diagnostic outputs of the endpoint devices to determine new optimal settings configurations for each of the endpoint devices, including the new endpoint device. In some embodiments, the systems proceeds to process the diagnostic outputs of the endpoint devices to determine new optimal setting configurations in the same way that is processed the diagnostic outputs of the endpoint devices in FIG. 2A, step 212.

Figure 4:
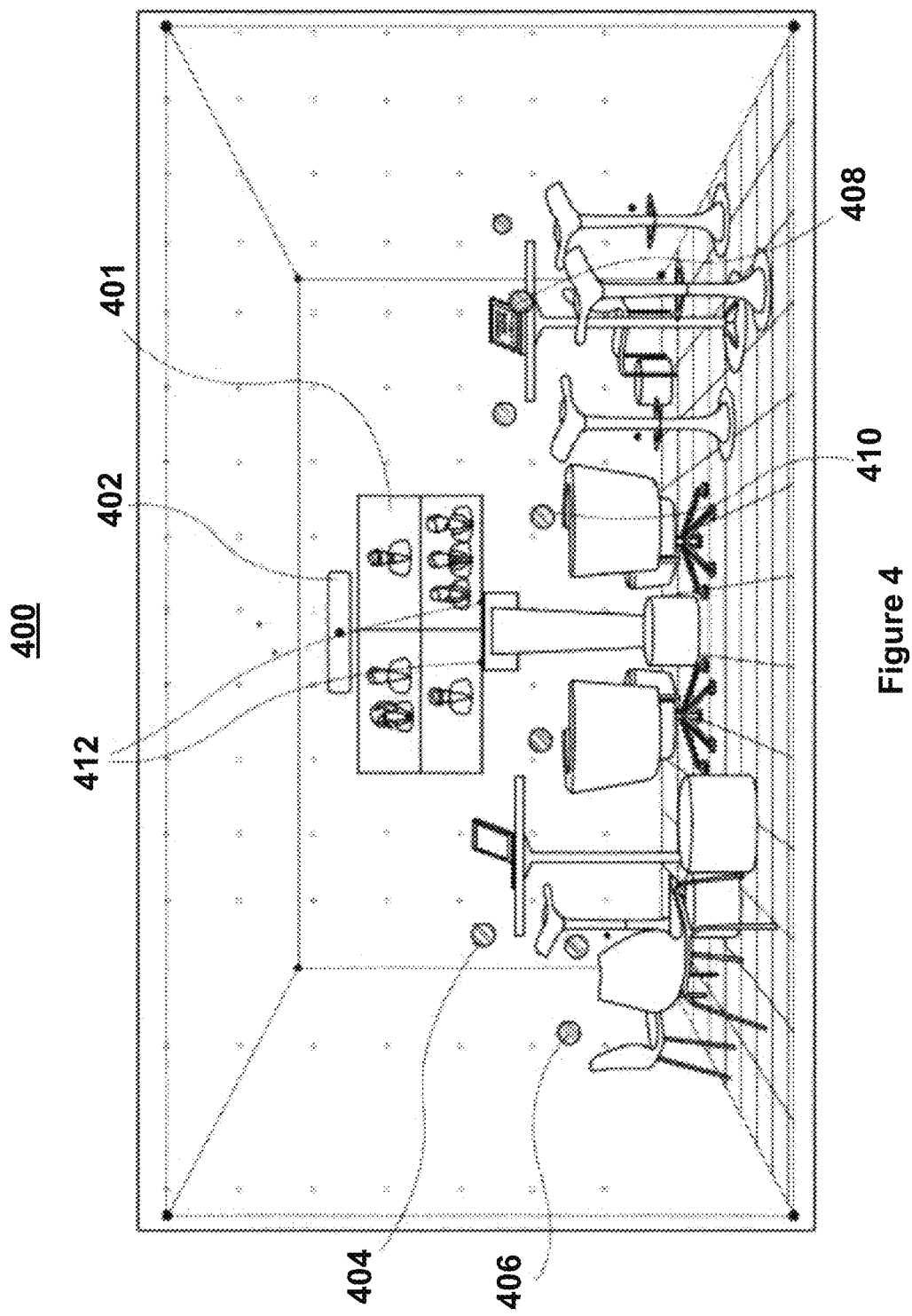
FIG. 4 is a diagram illustrating one example embodiment 400 of a video conferencing setup where intelligent configurations are determined for the endpoint devices in the room, in accordance with some embodiments.

FIG. 4 is a diagram illustrating one example embodiment 400 of a video conferencing setup where intelligent configurations are determined for the endpoint devices in the room, in accordance with some embodiments.

The example embodiment 400 illustrates a video conferencing room. Within the room, multiple endpoint devices are set up to capture the audio and/or video of video conferencing participants. A monitor 401 is also set up to play audio and/or video from live streams of four other video conference rooms, which are connected remotely within the video conferencing session. The video conference thus includes several people from different remote and local rooms, leading to a hybrid conference meeting composed of far-end and near-end participants.

A number of potential endpoint devices and participant configurations are possible within the depicted setup. First, an overheard video camera 402 captures video as well as audio of the participants from an overheard angle. The system may detect the audio as coming from an overhead device because the acoustic properties are different. The system may also process diagnostic output from the overheard camera to note that due to the fixed nature of the overhead camera, there are limited potential location and position settings which may be allowed for the device. However, it may still be possible for such parameters as video camera quality to be modified to fit an optimal settings configuration.

Next, a laptop computer 404 sits on a high table, next to a participant's chair as well as two different lower participants' seats. The example embodiment 400 also illustrates other endpoint devices 406, 408, 410, and 412.

Figure 5:
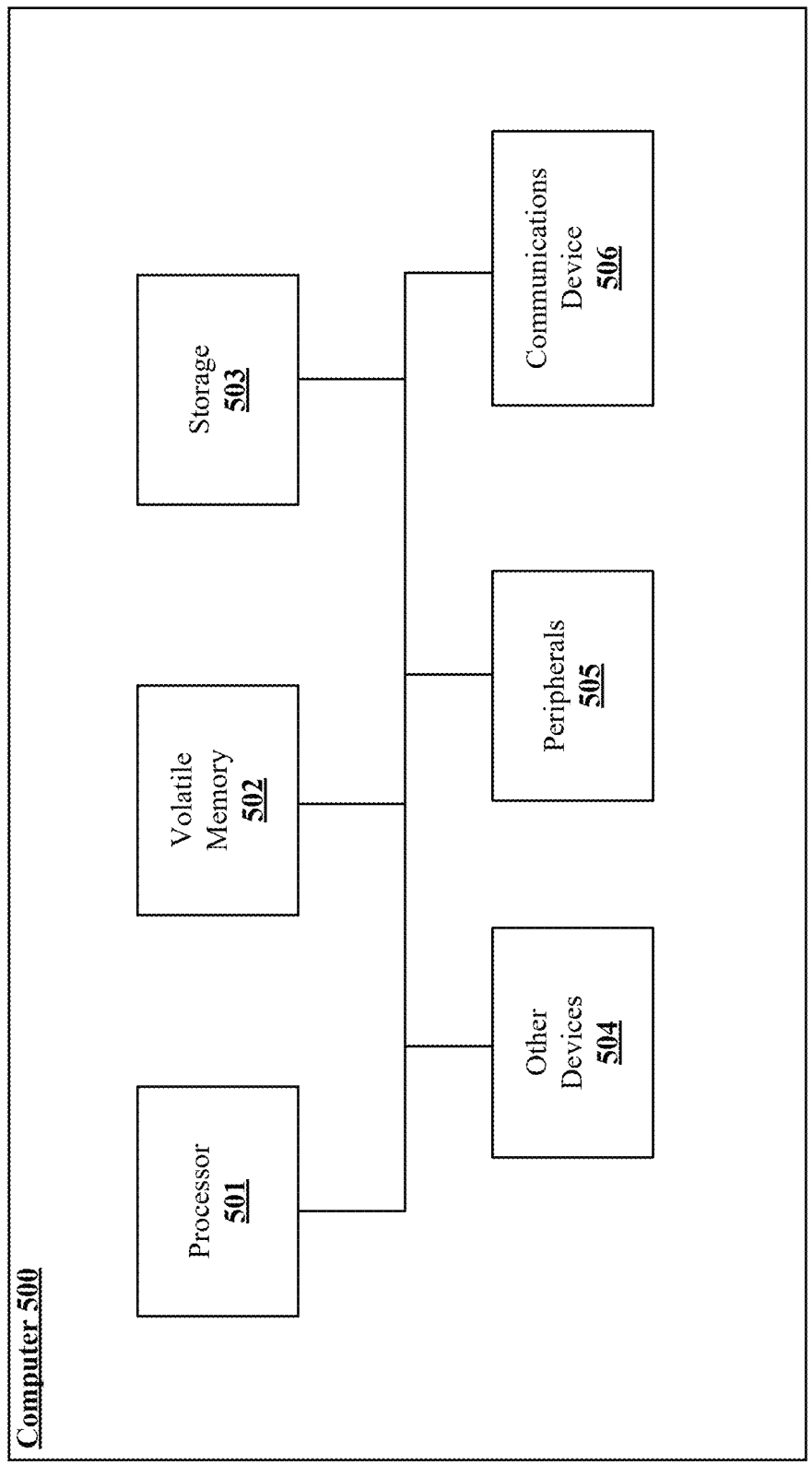
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-Rand DVD-R recorders/players. Communications device 506 may connect the computer 500 to an external medium. For example, communications device 506 may take the form of a network adapter that provides communications to a network. A computer 500 may also include a variety of other devices 504. The various components of the computer 500 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
   receiving diagnostic output from an endpoint device connected to a conference;
   determining a location and an orientation of the endpoint device based on the diagnostic output;
   determining whether the diagnostic output meets or exceeds a threshold for output quality;
   determining, based on determining whether the diagnostic output meets or exceeds the threshold for output quality, a configuration setting for the endpoint device based on proximity of an identified presenter to the endpoint device, the location, and the orientation of the endpoint device; and
   transmitting the configuration setting to the endpoint device.

2. The method of claim 1, wherein the diagnostic output includes the output quality of the endpoint device.

3. The method of claim 1, wherein determining the configuration setting for the endpoint device comprises:
   receiving the configuration setting from an artificial intelligence engine that is trained based on various configurations of endpoint devices.

4. The method of claim 1, further comprising:
   periodically determining a video conferencing context, wherein the video conferencing context includes additions or removals of presenters from a room that includes the endpoint device; and
   adapting the configuration setting based on changes to the video conferencing context.

5. The method of claim 1, further comprising:
   receive respective diagnostic outputs from endpoint devices located in a room that includes the endpoint device;
   determining, based on the respective diagnostic outputs, respective locations of presenters in the room; and
   adjusting the configuration setting for the endpoint device based on the respective locations of the presenters.

6. The method of claim 1, wherein transmitting the configuration setting to the endpoint device comprises:
   instructing the endpoint device to display a notification of the configuration setting specifying at least one of an optimal location or an optimal orientation of the endpoint device based on the configuration setting.

7. The method of claim 1, further comprising:
   determining respective proximities and positionings of the endpoint device to other endpoint devices at a conference location, and wherein determining the configuration setting comprises:
   determining the configuration setting based on the respective proximities and positionings.

8. A system, comprising one or more processors configured to execute instructions to:
   receive diagnostic output from an endpoint device connected to a conference;
   determine a location and an orientation of the endpoint device based on the diagnostic output;
   determine whether the diagnostic output meets or exceeds a threshold for output quality;
   determine, based on determining whether the diagnostic output meets or exceeds the threshold for output quality, a configuration setting for the endpoint device based on proximity of an identified presenter to the endpoint device, the location and, the orientation of the endpoint device; and transmit the configuration setting to the endpoint device.

9. The system of claim 8, wherein the one or more processors is further configured to execute instructions to:
    detect a new device in a room that includes the endpoint device;
    receive new diagnostic output from the new device; and
    transmit a new configuration setting to the endpoint device, wherein the new configuration setting is determined based on the new diagnostic output.

10. The system of claim 8, wherein the one or more processors is further configured to execute instructions to:
    determine that another endpoint device has been removed from a room that includes of the endpoint device; and
    in response to determining that the another endpoint device has been removed from the room, transmit a new configuration setting to the endpoint device.

11. The system of claim 8, wherein the endpoint device is part of a device mesh network, and wherein the configuration setting is determined based on a network topology of the device mesh network.

12. The system of claim 8, wherein the configuration setting is determined using an artificial intelligence engine that is trained based on various configurations of endpoint devices.

13. The system of claim 8, wherein the configuration setting is further determined based on respective diagnostic outputs received from other endpoint devices.

14. The system of claim 8, wherein the one or more processors is further configured to execute instructions to:
    instruct the endpoint device to display of a notification of the configuration setting specifying an optimal setting of the endpoint device based on the configuration setting.

15. A non-transitory computer readable medium storing instructions which, when executed by one or more processors, perform operations comprising:
    receiving diagnostic output from an endpoint device connected to a conference;
    determining a location and an orientation of the endpoint device based on the diagnostic output;
    determining whether the diagnostic output meets or exceeds a threshold for output quality;
    determining, based on determining whether the diagnostic output meets or exceeds the threshold for output quality, a configuration setting for the endpoint device based on proximity of an identified presenter to the endpoint device, the location, and the orientation of the endpoint device; and
    transmitting the configuration setting to the endpoint device.

16. The non-transitory computer readable medium of claim 15, wherein the configuration setting is further determined based on acoustic properties of a room that includes the endpoint device.

17. The non-transitory computer readable medium of claim 15, wherein the operations further comprising:
    instructing the endpoint device to display a user interface to a user enabling the user to configure the endpoint device according to the configuration setting.

18. The non-transitory computer readable medium of claim 15, wherein the at least one of the location or the orientation of the endpoint device are further determined based on beacon signals.

19. The non-transitory computer readable medium of claim 15, wherein the operations further comprise:
    identifying respective configurations of other endpoint devices in a room that includes the endpoint device based on data stored in a repository, and wherein the configuration setting is further determined based on the respective configurations.

20. The non-transitory computer readable medium of claim 15, wherein the configuration setting is determined using an artificial intelligence engine.

* * * * *